(12) United States Patent
Asamura et al.

(10) Patent No.: US 8,810,478 B2
(45) Date of Patent: Aug. 19, 2014

(54) MULTI-SCREEN DISPLAY DEVICE

(75) Inventors: Yoshinori Asamura, Tokyo (JP); Isao Yoneoka, Tokyo (JP); Takashi Matoba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 503 days.

(21) Appl. No.: 12/958,971

(22) Filed: Dec. 2, 2010

(65) Prior Publication Data

US 2011/0181565 A1 Jul. 28, 2011

(30) Foreign Application Priority Data

Jan. 27, 2010 (JP) ................................. 2010-015312

(51) Int. Cl.
*G09G 5/00* (2006.01)
*G09G 3/36* (2006.01)

(52) U.S. Cl.
USPC .......................................... 345/1.1; 345/102

(58) Field of Classification Search
CPC ................. G09G 2320/0666; G09G 2360/144
USPC .................................... 345/1.1, 102; 348/687
See application file for complete search history.

(56) References Cited

U.S. PATENT DOCUMENTS

| 7,253,814 | B2 * | 8/2007 | Kim et al. .............. 345/211 |
| 7,755,593 | B2 * | 7/2010 | Yamamoto et al. .......... 345/102 |
| 8,089,449 | B2 * | 1/2012 | Kohashikawa et al. ....... 345/102 |
| 2003/0020736 | A1 | 1/2003 | Kimura et al. |
| 2006/0221047 | A1 * | 10/2006 | Tanizoe et al. ............. 345/102 |
| 2007/0103599 | A1 * | 5/2007 | Wen-Chin ................ 348/687 |
| 2007/0159410 | A1 * | 7/2007 | Yamamoto et al. ............ 345/1.1 |
| 2010/0201716 | A1 * | 8/2010 | Tanizoe et al. .............. 345/690 |

FOREIGN PATENT DOCUMENTS

| CN | 1568017 A | 1/2005 |
| JP | 10-90645 A | 4/1998 |
| JP | 2004-341282 A | 12/2004 |
| JP | 2004-343581 | 12/2004 |

(Continued)

OTHER PUBLICATIONS

Piao, Yan. (Oct. 31, 2007). "Luminance Parameters in Full Color LED Display". Chinese Journal of Liquid Crystals and Displays, vol. 22, No. 5.

*Primary Examiner* — Alexander S Beck
*Assistant Examiner* — Ibrahim Khan
(74) *Attorney, Agent, or Firm* — Birch, Stewart, Kolasch & Birch, LLP.

(57) ABSTRACT

There has been a problem of displacement of luminance and chromaticity among multiple screens due to a temperature change and a temporal change of a light source of the screen. The present invention provides a multi-screen display device including a plurality of image display devices, in which one master device and one or a plurality of slave devices communicable with the master device are included, each of the image display devices is provided with a DMD that modulates light of a light source, a screen that projects an image by modulated output light of the DMD, and an RGB luminance sensor that detects luminance of light from the DMD in an off-state, to output a luminance detection value, the master device is provided with a setting part that sets a luminance setting value unified among the plurality of image display devices based on a value in accordance with the luminance detection values, and each image display device is further provided with a luminance/chromaticity corrector that controls luminance/chromaticity of an image displayed on the screen based on the luminance setting value.

11 Claims, 7 Drawing Sheets

(56) References Cited

FOREIGN PATENT DOCUMENTS

| JP | 2005-141043 | 6/2005 |
| JP | 2006-276725 | 10/2006 |
| JP | 2007-87816 A | 4/2007 |
| JP | 2007-147852 A | 6/2007 |
| JP | 2008-151838 A | 7/2008 |
| JP | 4204381 B2 | 1/2009 |
| WO | WO/2007/091506 * | 8/2007 ............ G09G 3/36 |

* cited by examiner

MULTI-SCREEN DISPLAY DEVICE

BACKGROUND OF THE INVENTION

1. Field of the Invention

The present invention relates to a multi-screen display device formed by assembling screens of a plurality of image display devices using semiconductor light emitting devices as light sources to constitute a larger display screen, and particularly relates to an image display device capable of automatizing an operation to adjust luminance and chromaticity at a time of installing a multi-screen display device.

2. Description of the Background Art

There has hitherto been proposed a multi-screen display device, formed by assembling a plurality of projectors and used as a multi-vision, in which each projector detects present luminance of its own with a luminance sensor, a reference projector receives luminance information from the other projectors and then creates and transmits luminance correction data, and each projector makes correction based on the luminance correction data, thereby to make the luminance uniform among the projectors (c.f. Japanese Patent Application Laid-Open No. 10-90645 (1998), p. 2, FIG. 1).

There has also been a display device that computes a correction factor for generating target luminance/chromaticity to be set in each projector, and performs luminance/chromaticity correction on a video signal to be inputted, thereby to hold the target luminance/chromaticity of the projectors constant (c.f. Japanese Patent Application Laid-Open No. 2004-341282, paragraphs 0008 to 0043, FIG. 1).

There has further been proposed a display device that detects a peripheral temperature of an LED, compares the detected temperature with a peripheral temperature of the LED which was previously recorded at a time of initial setting, and controls a current to be supplied to the LED, thereby to hold luminous colors of the LED constant (c.f. Japanese Patent Application Laid-Open No. 2007-87816, paragraphs 0030 to 0061, FIG. 3).

In such conventional devices as described above, when projected light is to be detected, a luminance sensor needs to be arranged between a projection lens and a screen, which causes no problem at a time of adjustment, but makes it difficult to acquire luminance data since the luminance sensor blocks light during an actual operation period. It has thus been impossible to detect a temporal change in light source and thereby to make correction that automatically follows this temporal change.

Further, in the case of controlling a current to be supplied to the LED to adjust the luminance, there has been a problem of displacement of the chromaticity due to a change in each LED current. Moreover, unlike the case of a lamp light source, there has been a problem of displacement of the chromaticity due to individual changes in luminance of R, G and B of the LED, made by a temperature change and a temporal change.

SUMMARY OF THE INVENTION

The present invention is directed to provide a multi-screen display device which, in the case of constituting a multi screen with image display devices each using a light source such as an LED, holds luminance/chromaticity constant regardless of a temporal change in light source, and is automatically adjustable so as to reduce luminance/chromaticity differences among projected type video display devices.

The present invention provides a multi-screen display device including a plurality of image display devices, wherein the plurality of image display devices include one master device and one or a plurality of slave devices communicable with the master device. Each of the image display devices is provided with a light source, a light valve that modulates light of the light source, a screen that projects an image by modulated output light of the light valve, and a luminance sensor that detects luminance of light from the light valve and outputs a luminance detection value in the case of the light valve being in an off-state. The master device is provided with a setting part that sets a luminance setting value unified among the plurality of image display devices based on a value in accordance with the luminance detection values in the plurality of image display devices. The each image display device is further provided with a controller that controls luminance/chromaticity of an image displayed on the screen in each device based on the luminance setting value.

According to the present invention, even when the luminance of the light source changes over time, the luminance is followed for measuring and controlling, and it is thereby possible to hold the luminance among the multiple screens constant.

These and other objects, features, aspects and advantages of the present invention will become more apparent from the following detailed description of the present invention when taken in conjunction with the accompanying drawings.

DESCRIPTION OF THE PREFERRED EMBODIMENTS

A. First Preferred Embodiment

<A-1. Configuration>

Figure 1:
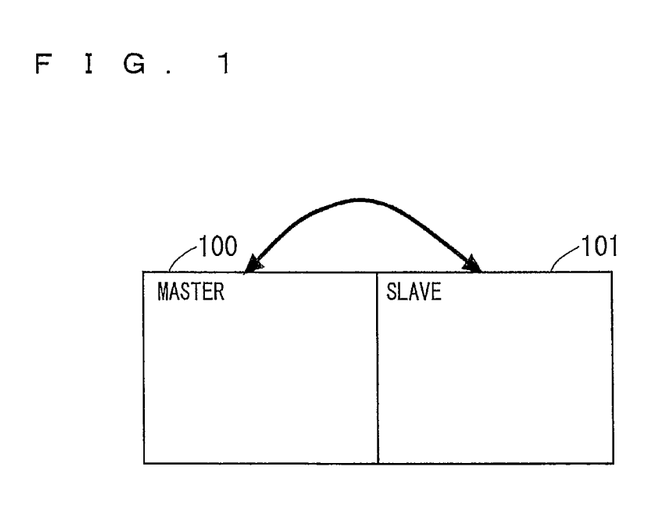
FIG. 1 is a view showing an outline of a multi-screen display device in a first preferred embodiment of the present invention.

FIG. 1 schematically shows a configuration of a multi-screen display device in a first preferred embodiment of the present invention. The shown multi-screen display device is one formed by assembling screens of a plurality of image display devices to constitute a larger display screen (large screen). For example, in an example of FIG. 1, the multi-screen display device is made up of two image display devices (master device 100, slave device 101). The master device 100 and the slave device 101 generally have the same configuration.

Figure 2:
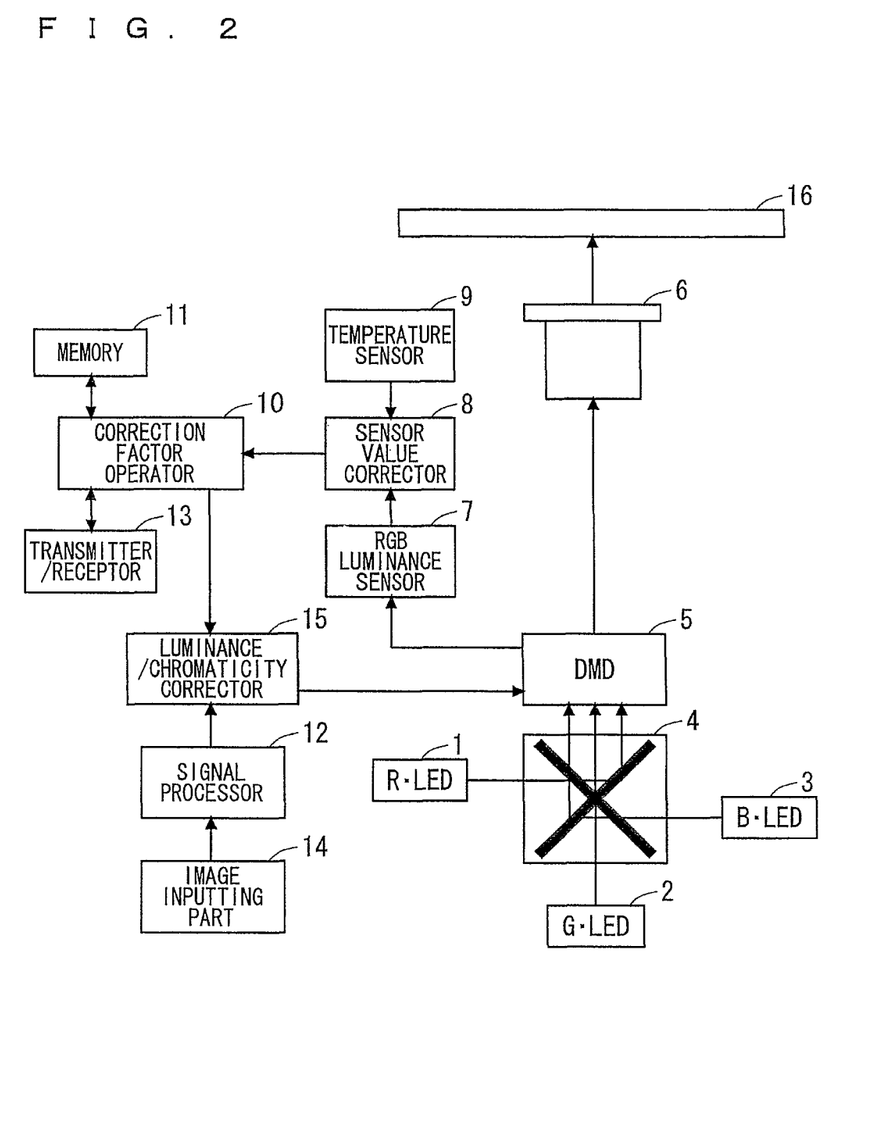
FIG. 2 is a view showing an outline of an image display device in the first preferred embodiment of the present invention.

Each image display device constituting the multi-screen display device has such a configuration as shown in FIG. 2. As shown in FIG. 2, the image display device is provided with an R-LED 1, a G-LED 2, and a B-LED 3 as light sources, two dichroic mirrors 4 that transmit and reflect light from those R-LED 1, G-LED 2, and B-LED 3, and a DMD (Digital Micromirror Device) 5 as a light valve into which light having passed through the dichroic mirrors 4 is inputted.

A light output of the R-LED 1 is reflected on the one dichroic mirror 4, a light output of the G-LED 2 passes through the two dichroic mirrors 4 as it is, and a light output of the B-LED 3 is reflected on the other dichroic mirror 4, and those outputs are inputted into the DMD 5.

Moreover, in the case of the DMD 5 being in an on-state, the image display device is further provided with a projector lens 6 into which light with its intensity modulated in the DMD 5 is inputted, and a screen 16 onto which an image based on a video signal is projected through the projector lens 6.

Furthermore, in the case of the DMD 5 being in an off-state, the image display device is provided with an RGB luminance sensor 7 into which light is inputted through the DMD 5, a temperature sensor 9 that measures a temperature in the RGB luminance sensor 7, a sensor value corrector 8 as a corrector that outputs a temperature-corrected luminance value from outputs obtained from the RGB luminance sensor 7 and the temperature sensor 9, a correction factor operator 10 as an operator that receives a temperature-corrected luminance value, and calculates a correction factor specific to the image display device, a memory 11 as a storing part that stores a luminance detection value as an output of the luminance sensor, a correction factor in the correction factor operator 10, and the like, a transmitter/receptor 13 that is connected with the correction factor operator 10 and allows communications among the plurality of image display devices, an image inputting part 14 into which an image signal is inputted, a signal processor 12 that processes a video signal inputted from the image inputting part 14 and outputs the signal to a luminance/chromaticity corrector 15, and the luminance/chromaticity corrector 15 as a controller that outputs to the DMD 5 an individual corrected luminance value obtained using a temperature-corrected luminance value and an individual correction factor based on outputs from the correction factor operator 10 and the signal processor 12.

<A-2. Operation>

In the case of the DMD 5 being in the off-state, the DMD 5 does not perform the light intensity modulating operation, and reflects light inputted through the dichroic mirrors 4 in a direction toward the RGB luminance sensor 7. Since the DMD 5 in the off-state certainly exists in a vertical synchronization signal period of a video signal, inputting this reflected light into the RGB luminance sensor 7 allows regular measurement of luminance of the R-LED 1, the G-LED 2 and the B-LED 3. The RGB luminance sensor 7 is made up of three kinds of luminance sensors R, G and B, and capable of individually measuring luminance with respect to wavelengths of R, G and B.

Figure 3:
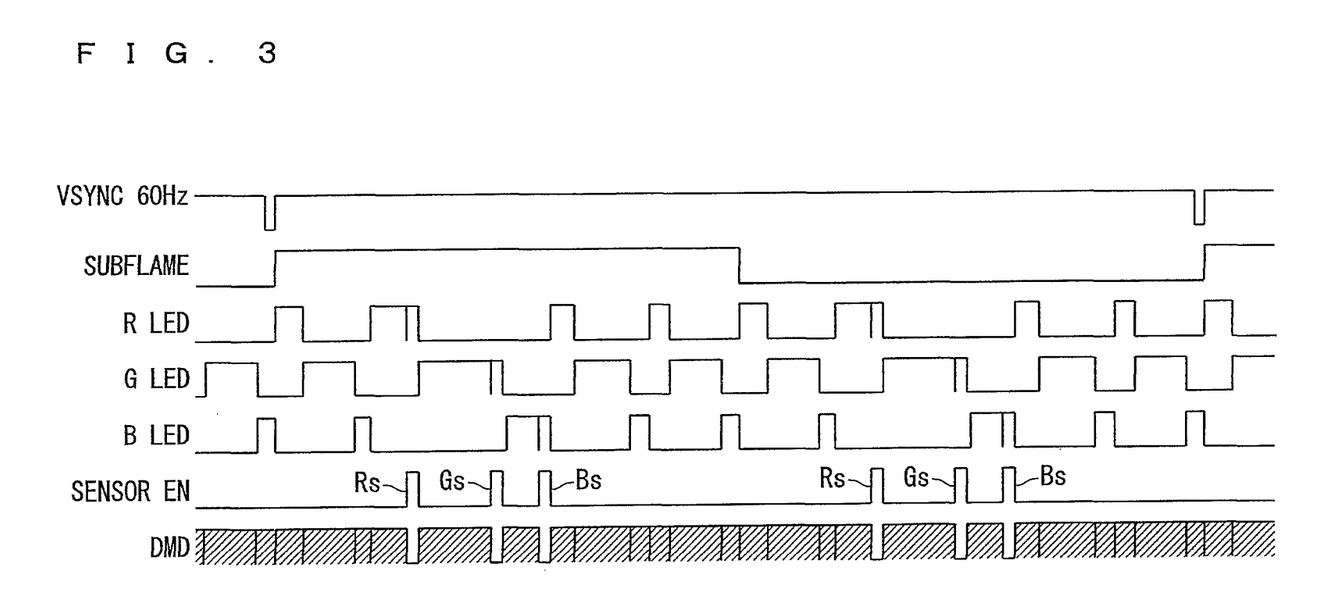
FIG. 3 is a view showing an operation of a DMD in the first preferred embodiment of the present invention.

Although the R-LED 1, the G-LED 2, and the B-LED 3 practically emit light on a time-division basis, for example as shown in FIG. 3, and the light are inputted into the DMD 5, since the DMD 5 is controlled so as to be in the off-state during periods for acquiring the respective luminance sensors of R, G and B ("SENSOR EN" in FIG. 3), luminance can be measured in the RGB luminance sensor 7 in synchronization with these periods. In other words, the RGB luminance sensor 7 is controlled so as to measure luminance of the R-LED 1 in synchronization with a period of Rs in FIG. 3. Similarly, the sensor is controlled so as to measure luminance of the G-LED 2 in synchronization with a period of Gs, and measure luminance of the B-LED 3 in synchronization with a period of Bs.

Figure 4:
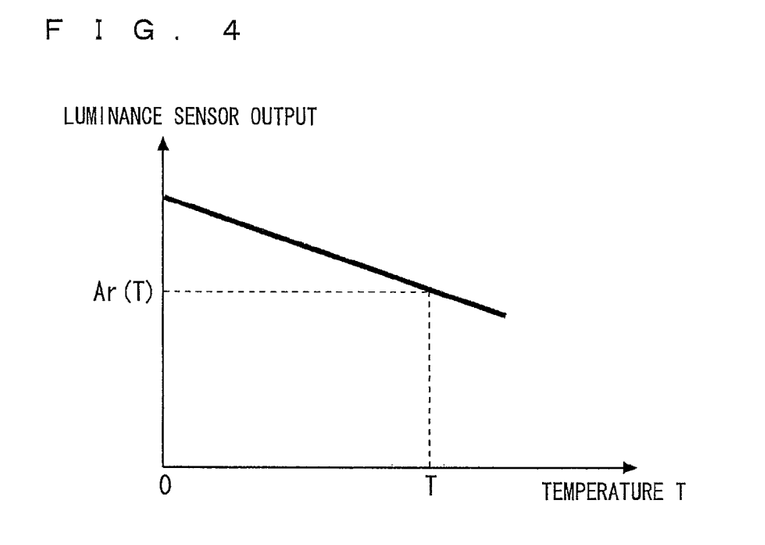
FIG. 4 is a view showing an example of a temperature characteristic of a luminance sensor in the first preferred embodiment of the present invention.

The RGB luminance sensor 7 has temperature characteristics, and the relation between an output of the RGB luminance sensor 7 and actual luminance is displaced depending on a temperature. For example, when an output of the R-LED 1 is constant, a read value of the RGB luminance sensor 7 with respect to R changes as shown in FIG. 4. As for the read value of the RGB luminance sensor 7, with R, G and B respectively having different temperature characteristics, it is desirable that a temperature on the periphery of the RGB luminance sensor 7 be measured in the temperature sensor 9 and outputs of the RGB luminance sensor 7 be subjected to individual temperature correction for R, G and B in the sensor value corrector 8 as the correcting part. In practice, respective measurement results of R, G and B, outputted from the RGB luminance sensor 7, are taken as luminance detection values Yr, Yg and Yb, and from results of the measurement in the temperature sensor 9, a temperature correction factor with respect to the luminance sensor of R is calculated as Ar(T), a temperature correction factor with respect to the luminance sensor of G is calculated as Ag(T), and a temperature correction factor with respect to the luminance sensor of B is calculated as Ab(T).

When luminance values after correction by the temperature correction factors are taken as temperature-corrected luminance values Sr, Sg and Sb, the following holds $Sr = Ar(T) \times Yr$ $Sg = Ag(T) \times Yg$ $Sb = Ab(T) \times Yb.$ The sensor value corrector 8 outputs the temperature-corrected luminance values Sr, Sg and Sb to the correction factor operator 10 as the operator.

Meanwhile, into the luminance/chromaticity corrector 15 of the image display device, a video signal is inputted which was inputted from the outside through the image inputting part 14 and subjected to signal processing such as scaling in the signal processor 12. In the luminance/chromaticity corrector 15, the video signal outputted from the signal processor 12 is corrected by the correction factor operator 10, and then converted into a drive signal for driving the DMD 5, and the converted signal is outputted to the DMD 5, to control the DMD 5. In this manner, an image in accordance with the video signal can be displayed on the screen 16.

Next, a method for adjusting luminance/chromaticity in the multi-screen display device is described. Since there are variations in characteristics of outputs of the LED light sources of R, G and B and the screens in the respective image display devices, luminance/chromaticity adjustment need to be performed in the multi-screen display device.

Figure 5:
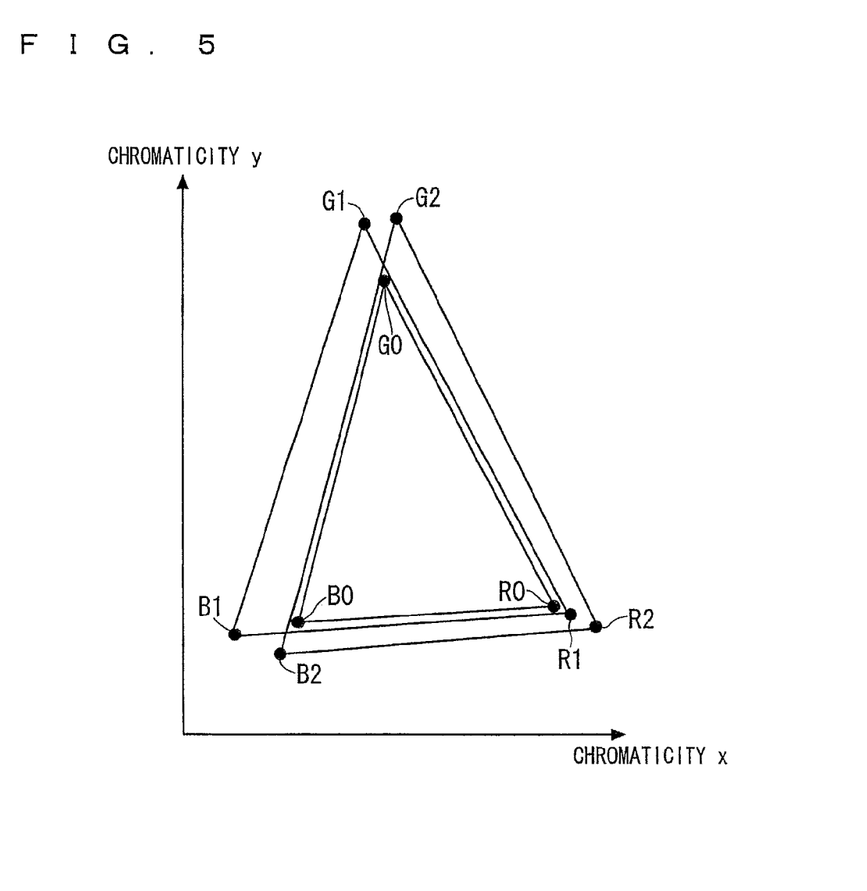
FIG. 5 is a view showing an example of a color reproduction range as a target in the first preferred embodiment of the present invention.

FIG. 5 shows chromaticity of two projectors A, B at a time of installation, and target values of the chromaticity on an x-y diagram for chromaticity. In FIG. 5, it is assumed that chromaticity of red, blue and green LED light sources of the projector A are represented at positions of R1, B1 and G1, and chromaticity of red, blue and green LED light source of the projector B are represented at positions of R2, B2 and G2.

As shown in the figure, when there are variations in chromaticity between the two projectors A and B, if the two projectors A and B are aligned with the chromaticity thereof not adjusted, although the projectors display the same images, colors thereof are seen different, leading to appearance of a joint between the two projectors. Hence luminance/chromaticity adjustment is required between the projectors.

Incidentally, in the projector A, chromaticity inside a triangle with R1, B1 and G1 as its vertices can be displayed by changing a mixing ratio of light of the three-colored light sources, and in the projector B, chromaticity inside a triangle with R2, B2 and G2 as its vertices can be displayed by the same means. Therefore, since a triangle with R0, B0 and G0 as its vertices thereof is inside the triangles formed by the projectors A and B, chromaticity of R0, G0 and B0 in FIG. 5 can be displayed by either of the projectors.

In the luminance/chromaticity corrector 15, a matrix operation as below is further performed on the temperature-corrected luminance values Sr, Sg and Sb for correcting a video signal outputted from the signal processor 12, to change the mixing ratio of light of the three-colored light sources so as to perform luminance/chromaticity correction. In other words, characteristics specific to each image display device are considered. Herein, RR0, RG0, RB0, GR0, GG0, GB0, BR0, BG0 and BB0 in Equation 1 are individual correction factors that are calculated in the correction factor operator 10, as well as being conversion factors for converting inputted RGB signals into the chromaticity range of R0, G0 and B0 in FIG. 5. It is to be noted that individual corrected luminance values Sr0, Sg0, Sb0 are RGB signals after luminance/chromaticity correction.

$$\begin{pmatrix} Sr0 \\ Sg0 \\ Sb0 \end{pmatrix} = \begin{pmatrix} RR0 & RG0 & RB0 \\ GR0 & GG0 & GB0 \\ BR0 & BG0 & BB0 \end{pmatrix} \begin{pmatrix} Sr \\ Sg \\ Sb \end{pmatrix} \quad \text{Equation 1}$$

In Equation 1, for example with respect to the R signal, the individual corrected luminance value $Sr0=RR0 \times Sr+RG0 \times Sg+RB0 \times Sb$, and R, G and B are mixed at the ratio of the individual correction factors RR0, RG0 and RB0, to perform chromaticity correction on the R signal.

Further, RR0+RG0+RB0 is the luminance level, and when RR0+RG0+RB0 exceeds 1, it exceeds the luminance level representable by Sr0, and hence it is necessary to set RR0+RG0+RB0≦0. This also applies to the G signal and the B signal, and detailed descriptions thereof are thus omitted.

In practice, when initial adjustment is made on the user's side, luminance/chromaticity adjustment is performed in the multi-screen display device, and the individual correction factors RR0, RG0, RB0, GR0, GG0, GB0, BR0, BG0 and BB0 in Equation 1 are adjusted such that the chromaticity of each image display device becomes R0, G0 and B0 in FIG. 5. At the time of completion of the adjustment, the initial individual correction factors RR0, RG0, RB0, GR0, GG0, GB0, BR0, BG0 and BB0 and the temperature-corrected luminance values S0rR, S0gG, S0bB outputted from the sensor value corrector 8 at a time of adjustment are stored into the memory 11. In other words, adjusting the individual correction factors in Equation 1 described above inside each image display device can make the luminance/chromaticity uniform in all the image display devices constituting the multi-screen display device.

Figure 6:
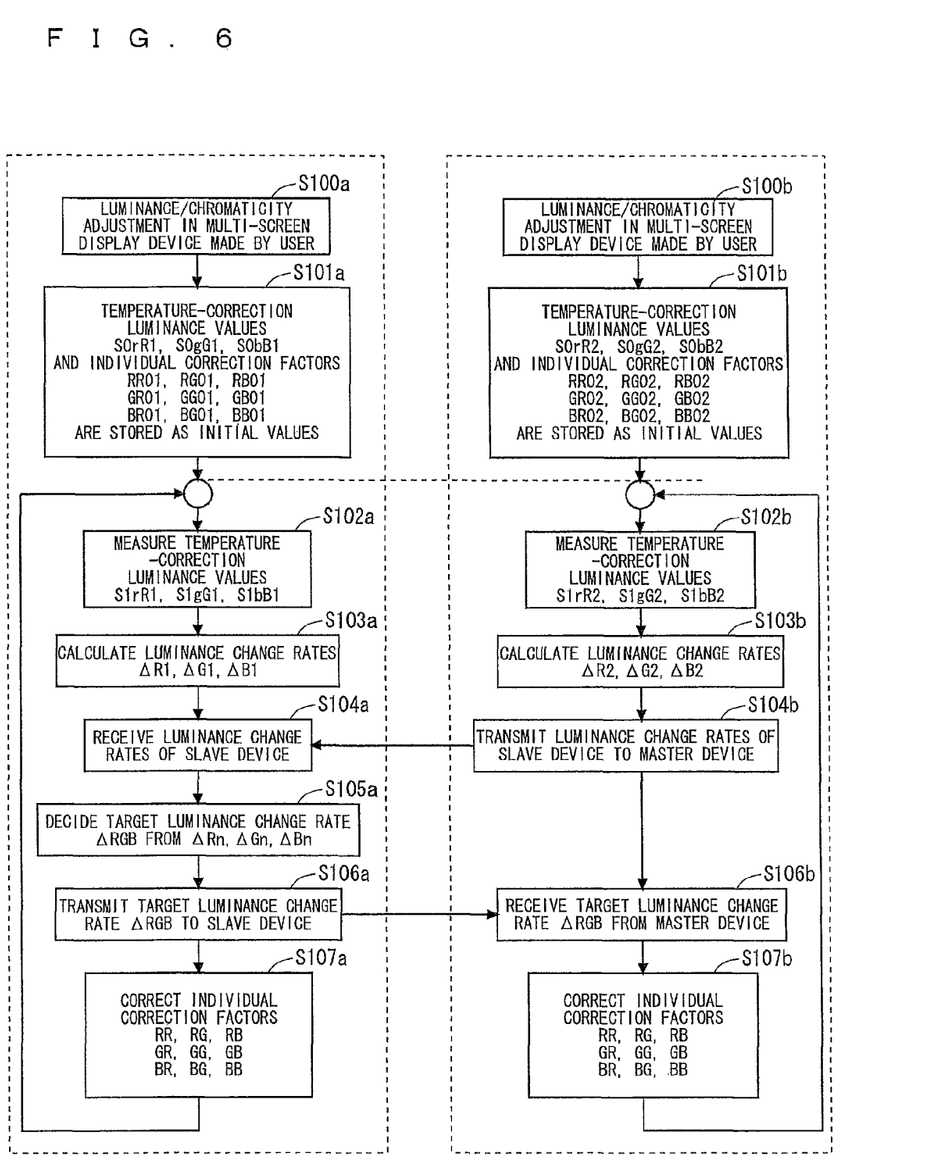
FIGS. 6 and 7 are flowcharts each explaining an operation in the first preferred embodiment of the present invention.

However, luminance outputs of the LED light sources of R, G and B change depending on a temperature change, a temporal change, and the like. Therefore, further adjustment is required such that the luminance/chromaticity in the multi-screen display device are constantly uniform regardless of passage of time. Hereinafter described is luminance/chromaticity adjustment with reference to passage of time in the multi-screen display device in accordance with FIG. 6. Herein, steps S100a to S107a of FIG. 6 are a flowchart for the master device 100, and steps S100b to S107b are a flowchart for the slave device 101.

In step S100a and step S100b, the luminance/chromaticity in the multi-screen display device are adjusted by a user so as to be uniform.

In step S101a and step S101b, temperature-corrected luminance values S0rRn, S0gGn and S0bBn (n=1, 2) in the units of R, G and B, outputted from the sensor value corrector 8 at a time of adjustment in step S100a and step S100b, and individual correction factors RR0n, RG0n, RB0n, GR0n, GG0n, GB0n, BR0n, BG0n and BB0n (n=1, 2), calculated in the correction factor operator 10, are stored as initial values into the memory 11.

Next, after a certain period of time, temperature-corrected luminance values S1rRn, S1gGn and S1bBn (n=1, 2) in the units of R, G and B, outputted from the sensor value corrector 8, are acquired (step S102a, step S102b).

Subsequently, from the temperature-corrected luminance values at a time of initial setting, which are stored in the memory 11, and the current temperature-corrected luminance values acquired in step S102a and step S102b, luminance change rates as luminance change values in the units of R, G and B are calculated in a calculator, not shown. Herein, change rates (ΔR1, ΔG1, ΔB1) of R, G and B of the master device 100 are:

$$\Delta R1 = S1rR1/S0rR1$$

$$\Delta G1 = S1gG1/S0gG1$$

$$\Delta B1 = S1bB1/S0bB1,$$

and change rates (ΔR2, ΔG2, ΔB2) of R, G and B of the slave device 101 are:

$$\Delta R2 = S1rR2/S0rR2$$

$$\Delta G2 = S1gG2/S0gG2$$

$$\Delta B2 = S1bB2/S0bB2$$

(step S103a, step S103b).

The slave device 101 transmits ΔR2, ΔG2 and ΔB2 to the master device 100, and the master device receives those (step S104a, step S104b).

In a setting part, not shown, of the master device 100, the minimum luminance change rate among received luminance change rates of all the image display devices constituting the multi-screen display device is detected as a target luminance change rate which is a target luminance change value (step S105a).

$$\Delta RGB = \min(\Delta R1, \Delta G1, \Delta B1, \Delta R2, \Delta G2, \Delta B2)$$

Further, the master device 100 transmits a target luminance change rate ΔRGB of the whole of the multi-screen display device to the slave device 101 (step S106a).

The slave device 101 receives the target luminance change rate ΔRGB from the master device 100 (step S106b).

Each image display device of the multi-screen display device controls the luminance/chromaticity of the LED based on the target luminance change rate ΔRGB, whereby the luminance of other LED is adjusted to the luminance of the LED of R, G and B having the minimum luminance change rate from the luminance of the LED at the time of initial setting to those at the present. Accordingly, the luminance/chromaticity of all the image display devices constituting the multi-screen display device can be held uniform.

Specifically, in the master device 100 and the slave device 101, the individual correction factors RR0, RG0, RB0, GR0, GG0, GB0, BR0, BG0 and BB0 in Equation 1 are corrected using the target luminance change rate ΔRGB calculated by the master device 100, as shown in Equation 2 (step S107a, step S107b).

$$\begin{pmatrix} Sr0 \\ Sg0 \\ Sb0 \end{pmatrix} = \begin{pmatrix} RR & RG & RB \\ GR & GG & GB \\ BR & BG & BB \end{pmatrix} \begin{pmatrix} Sr \\ Sg \\ Sb \end{pmatrix} \quad \text{Equation 2}$$

$RR = S0rRn/S1rRn \times \Delta RGB \times RR0n$ $RG = S0gGn/S1gGn \times \Delta RGB \times RG0n$ $RB = S0bBn/S1bBn \times \Delta RGB \times RB0n$ $GR = S0rRn/S1rRn \times \Delta RGB \times GR0n$ $GG = S0gGn/S1gGn \times \Delta RGB \times GG0n$ $GB = S0bBn/S1bBn \times \Delta RGB \times GB0n$ $BR = S0rRn/S1rRn \times \Delta RGB \times BR0n$ $BG = S0gGn/S1gGn \times \Delta RGB \times BG0n$ $BB = S0bBn/S1bBn \times \Delta RGB \times BB0n \ (n = 1, 2)$ That is, in Equation 2, the individual correction factors RR0, RG0, RB0, GR0, GG0, GB0, BR0, BG0 and BB0 are corrected in line with the luminance change rate ΔRGB of the LED with the most decreased luminance (LED with the minimum luminance change rate).

For example, in Equation 2, a parameter multiplied by Sr (output of R-LED) is S0rR/S1rR×ΔRGB, a parameter multiplied by Sg (output of G-LED) is S0gG/S1gG×ΔRGB, and a parameter multiplied by Sb (output of B-LED) is S0bB/S1bR×ΔRGB, whereby it is possible to adjust the luminance/chromaticity of all the image display devices constituting the multi-screen display device, while keeping a balance of chromaticity among R, G and B.

For example, ΔRGB=70% in the case of ΔR1=70%, ΔG1=80%, ΔB1=90%, ΔR2=75%, ΔG2=85% and ΔB2=95%, and in this case, correction factors of the master device 100 are:

$RR=1/0.7\times0.7\times RR0$ $RG=1/0.8\times0.7\times RG0$ $RB=1/0.9\times0.7\times RB0$ $GR=1/0.7\times0.7\times GR0$ $GG=1/0.8\times0.7\times GG0$ $GB=1/0.9\times0.7\times GB0$ $BR=1/0.7\times0.7\times BR0$ $BG=1/0.8\times0.7\times BG0$ $BB=1/0.9\times0.7\times BB0.$ Further, ΔRGB=105% in the case of ΔR1=120%, ΔG1=115%, ΔB1=110%, ΔR2=115%, ΔG2=110% and ΔB2=105%.

As thus described, even when the luminance of the LED light source changes due to a temperature change and a temporal change after initial setting of the luminance/chromaticity of the multi-screen display device, correction factors regarding luminance/chromaticity can be corrected in accordance with luminance change rates of R, G and B of each image display device, so as to hold the luminance/chromaticity of the multi-screen display devices constant.

Further, with the luminance of the LED of R, G and B being measured by use of light of the DMD 5 in the off-state, it is not necessary to arrange the luminance sensor on a light path of the image display device, and no shade of the luminance sensor appears on the screen.

In addition, although the multi-screen display device is made up of the two image display devices in FIG. 1 in the first preferred embodiment, it is not necessarily required to be made up of two devices, and may be made up of a plurality of devices, which are not less than two devices, with no problem.

Figure 7:
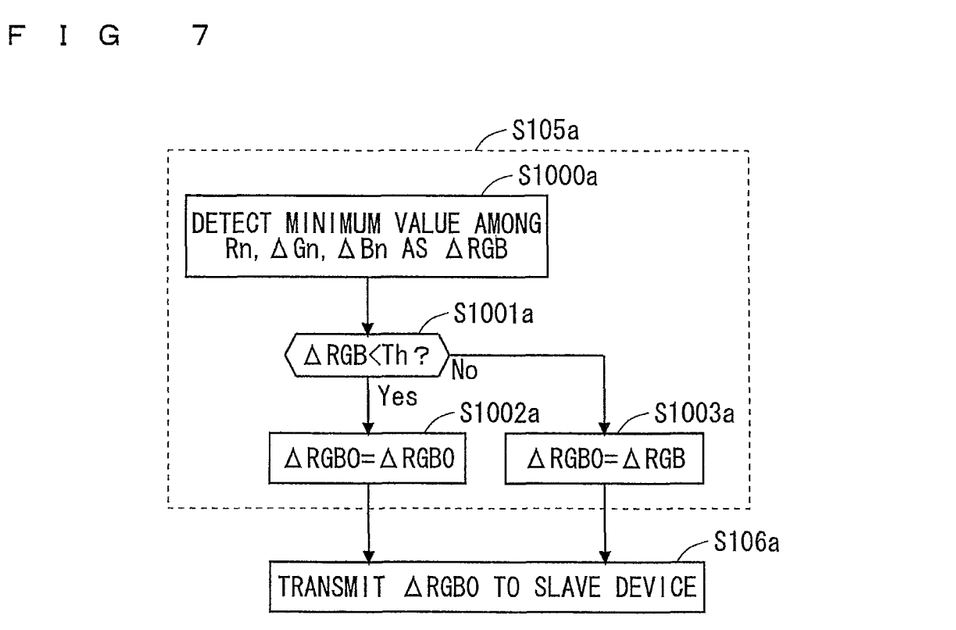

Further, although in step S105*a* of FIG. 6 the minimum luminance change rate ΔRGB among the luminance change rates of all the image display devices constituting the multi-screen display device is taken as the target luminance change rate of the whole of the multi-screen display device, steps as shown in FIG. 7 may also be taken.

Specifically, the minimum value among ΔRn, ΔGn and ΔBn is detected as ΔRGB (step S1000*a*), and it is determined whether or not ΔRGB is larger than a threshold Th (step S1001*a*).

When ΔRGB is smaller than the threshold Th, the value (ΔRGB0) corrected last time is held as it is (step S1002*a*), and ΔRGB0 is transmitted to the slave device 101 (step S106*a*).

When ΔRGB is larger than the threshold Th, ΔRGB is replaced by the value (ΔRGB0) corrected last time (step S1003*a*), and ΔRGB0 is transmitted to the slave device 101 (step S106*a*).

<A-3. Effect>

According to the first preferred embodiment of the present invention, in a multi-screen display device having a plurality of image display devices, the plurality of image display devices include one master device 100 and one or a plurality of slave devices 101 communicable with the master device 100, each of the image display devices is provided with the DMD 5 as a light valve that modulates light of the R-LED 1, the G-LED 2 and B-LED 3 as light sources, the screen 16 that projects an image by modulated output light of the DMD 5, the RGB luminance sensor 7 that detects luminance of light from the DMD 5 in the off-state and outputs a luminance detection value, the master device 100 is provided with a setting part that sets a luminance setting value unified among the plurality of image display devices based on a value in accordance with the luminance detection values in the plurality of image display devices, and each image display device is further provided with the luminance/chromaticity corrector 15 as a controller that controls luminance/chromaticity of an image displayed on the screen 16 in each device based on the luminance setting value. Thereby, even when the luminance of the R-LED 1, the G-LED 2 and B-LED 3 change over time, the changes are followed for measuring and controlling the luminance without readjustment by the user, so that a display can be made with the luminance held uniform among the multiple screens and a joint among the image display devices being invisible.

Further, according to the first preferred embodiment of the present invention, the multi-screen display device further has the memory 11 as a storing part that stores the luminance detection value, and a calculator that calculates a luminance change value as a value in accordance with the luminance detection value by use of the luminance detection value stored into the memory 11 and the luminance detection value stored into the memory 11 last time, wherein the setting part in the master device 100 sets a target luminance change value as the luminance setting value with respect to a target luminance value unified among the plurality of image display devices, based on the luminance change values in the plurality of image display devices.

It is thereby possible to perform luminance control based on a temporal change in luminance, so as to hold the luminance constant among the multiple screens.

Further, according to the first preferred embodiment of the present invention, in the multi-screen display device, each image display device is further provided with the temperature sensor 9 that detects a temperature in the RGB luminance sensor 7, the sensor value corrector 8 as a corrector that corrects the luminance detection value by use of an output of the temperature sensor 9, and outputs a temperature-corrected luminance value, and the correction factor operator 10 as an operator that computes an individual correction factor specific to each image display device based on the target luminance value, wherein the memory 11 as the storing part stores the temperature-corrected luminance value and the individual correction factor, the calculator calculates a luminance change value by use of the temperature-corrected luminance value stored into the memory 11 and the temperature-corrected luminance value stored into the memory 11 last time, and the luminance/chromaticity corrector 15 as the controller corrects the individual correction factor based on the target luminance change value, and controls luminance/chromaticity of an image displayed on the screen 16 in each device based on the corrected individual correction factor.

Thereby, it is further possible to perform luminance control with more accuracy in consideration of temperature correction and individual correction, so as to hold the luminance constant among the multiple screens.

Further, according to the first preferred embodiment of the present invention, in the multi-screen display device, the target luminance value is set based on the minimum luminance detection value among the plurality of image display devices. It is thereby possible to hold the luminance constant among the multiple screens, within luminance displayable by the plurality of screen display devices.

Further, according to the first preferred embodiment of the present invention, in the multi-screen display device, the luminance change value is a ratio of the temperature-corrected luminance value stored into the memory 11 as the storing part to the temperature-corrected luminance value stored into the memory 11 last time.

It is thereby possible to perform luminance control on a temporal change in luminance based on the change rate, so as to hold the luminance constant among the multiple screens.

Further, according to the first preferred embodiment of the present invention, in the multi-screen display device, the luminance/chromaticity corrector 15 as the controller controls luminance/chromaticity of an image displayed on the screen 16 in each device by use of a value obtained by multiplying the target luminance change value, the individual correction factor and the luminance change value. It is thereby possible to perform luminance control in consideration of temperature correction and individual correction, so as to hold the luminance constant among the multiple screens.

Further, according to the first preferred embodiment of the present invention, in the multi-screen display device, in the case of the target luminance change value being not larger than a predetermined value, the luminance/chromaticity corrector 15 as the controller determines that a decrease in luminance is large, and stops controlling luminance/chromaticity of an image displayed on the screen 16 in each device. It is thereby possible to suppress an extreme decrease in luminance of the whole of the multiple screens in the case of a large decrease in luminance of part of the LED due to a failure or the like.

B. Second Preferred Embodiment

<B-1. Operation>

Figure 8:
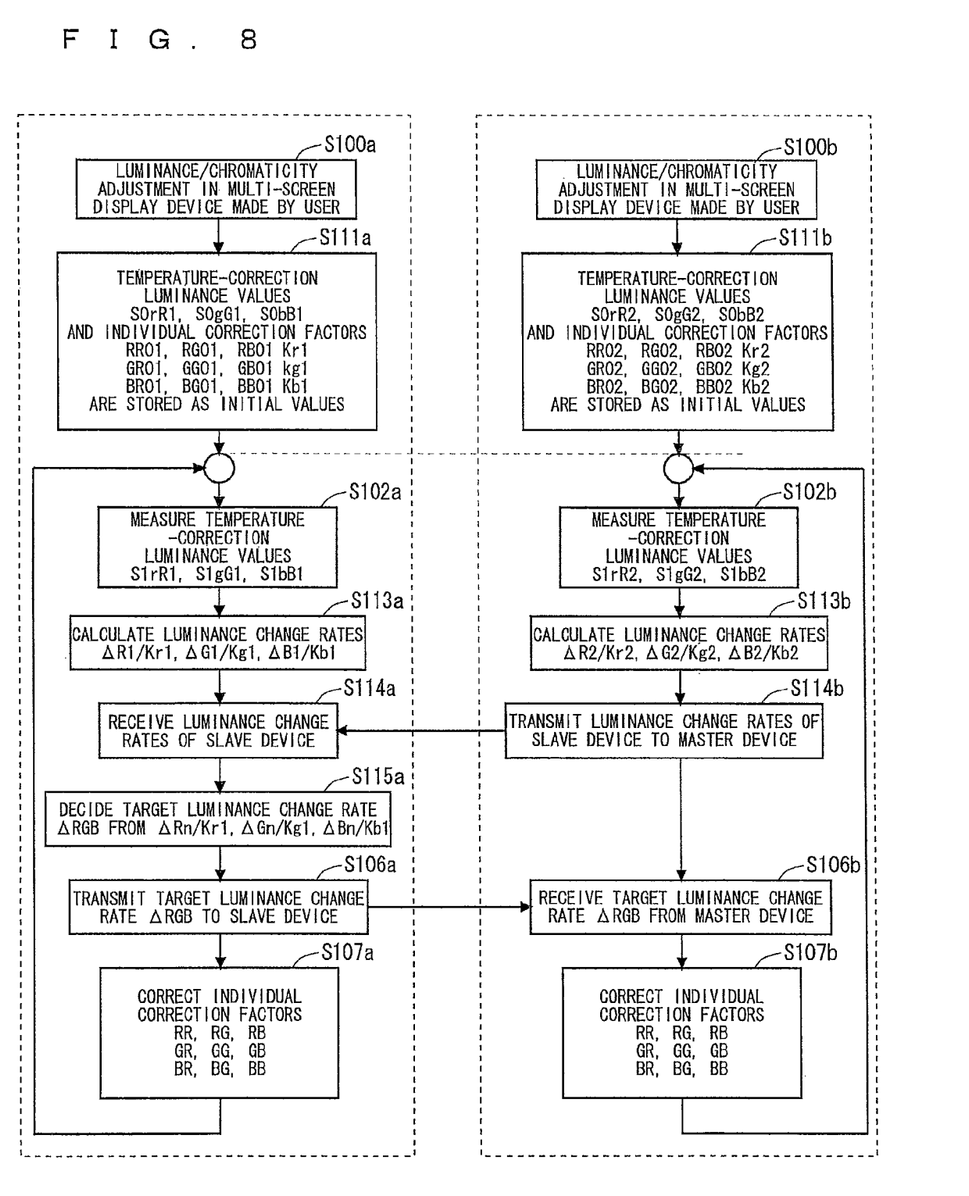
FIG. 8 is a flowchart explaining an operation in the second preferred embodiment of the present invention.

FIG. 8 is a flowchart showing an operation of a multi-screen display device in the second preferred embodiment according to the present invention. Although in the first preferred embodiment the minimum luminance change rate among all the image display devices constituting the multi-screen display device was taken as the target luminance change rate ΔRGB in step S105a of FIG. 6, there is a case as follows with the correction factors regarding the luminance/chromaticity in Equation 1.

$Kr = RR0 + RG0 + RB0 (Kr \leq 1)$ $Kg = GR0 + GG0 + GB0 (Kg \leq 1)$ $Kb = BR0 + BG0 + BB0 (Kb \leq 1)$      Equation 3

The above equation represents a luminance level after luminance/chromaticity correction, and the level is 1 at the maximum. Specifically, when Kr, Kg and Kb are smaller than 1, at the time of adjustment in the multi-screen display device, the luminance is corrected to be low with the individual correction factors in Equation 1, so as to be in line with luminance/chromaticity levels of the other image display devices.

Accordingly, when luminance decreases due to a temperature change and a temporal change, an amount of luminance having been decreased by the individual correction factor may be corrected, to decide target luminance of the whole of the multi-screen display device. A description is given below with reference to FIG. 8.

In step S100a and step S100b, luminance/chromaticity in the multi-screen display device are adjusted by the user so as to be uniform.

In step S111a and step S111b, temperature-corrected luminance values S0rRn, S0gGn and S0bBn (n=1, 2) in the units of R, G and B, outputted from the sensor value corrector 8 at the time of adjustment in step S100a and step S100b, individual correction factors RR0n, RG0n, RB0n, GR0n, GG0n, GB0n, BR0n, BG0n, BB0n (n=1, 2), calculated in the correction factor operator 10, and Krn, Kgn and Kbn (n=1, 2) shown in Equation 3 are stored as initial values into the memory 11.

Next, after a certain period of time, temperature-corrected luminance values S1rRn, S1gGn, S1bBn (n=1, 2) in the units of R, G and B, outputted from the sensor value corrector 8, are acquired (step S102a, step S102b).

Subsequently, luminance change rates of R, G and B are calculated in the calculator, not shown, in step S113a and step S113b. Specifically, the maximum luminance obtained by changing the correction factors of R, G and B of the master device 100 are ΔR1/Kr1, ΔG1/Kg1 and ΔB1/Kb1, and those of R, G and B of the slave device 101 are ΔR2/Kr2, ΔG2/Kg2 and ΔB2/Kb2.

The slave device 101 transmits ΔR2/Kr2, ΔG2/Kg2 and ΔB2/Kb2 to the master device 100, and the master device receives those (step S114a, step S114b).

In the setting part, not shown, of the master device 100, by use of Kr, Kg and Kb as values based on the individual correction factors, the minimum luminance change rate among received luminance change rates of all the image display devices constituting the multi-screen display device is detected as a target luminance change rate (step S115a).

$\Delta RGB = \min(\Delta R1/Kr1, \Delta G1/Kg1, \Delta B1/Kb1, \Delta R2/Kr2, \Delta G2/Kg2, \Delta B2/Kb2)$ Next, the master device 100 transmits a target luminance change rate ΔRGB of the whole of the multi-screen display device to the slave device 101 (step S106b).

The slave device 101 receives the target luminance change rate ΔRGB from the master device 100 (step S106b)

In the master device 100 and the slave device 101, in the same manner as in the first preferred embodiment, by use of ΔRGB calculated by the master device 100, the individual correction factors RR0, RG0, RB0, GR0, GG0, GB0, BR0, BG0 and BB0 in Equation 1 are corrected as shown in Equation 4 (step S107a, step S107b).

$$\begin{pmatrix} Sr0 \\ Sg0 \\ Sb0 \end{pmatrix} = \begin{pmatrix} RR & RG & RB \\ GR & GG & GB \\ BR & BG & BB \end{pmatrix} \begin{pmatrix} Sr \\ Sg \\ Sb \end{pmatrix} \quad \text{Equation 4}$$

$RR = S0rRn/S1rRn \times \Delta RGB \times RR0n$ $RG = S0gGn/S1gGn \times \Delta RGB \times RG0n$ $RB = S0bBn/S1bBn \times \Delta RGB \times RB0n$ $GR = S0rRn/S1rRn \times \Delta RGB \times GR0n$ $GG = S0gGn/S1gGn \times \Delta RGB \times GG0n$ $GB = S0bBn/S1bBn \times \Delta RGB \times GB0n$ $BR = S0rRn/S1rRn \times \Delta RGB \times BR0n$ $BG = S0gGn/S1gGn \times \Delta RGB \times BG0n$ $BB = S0bBn/S1bBn \times \Delta RGB \times BB0n$ ($n = 1, 2$)

For example, ΔRGB1=ΔR1/Kr1=0.875 when
ΔR1=0.7, Kr1=0.8
ΔG1=0.7, Kg1=0.85
ΔB1=0.7, Kb1=0.98
ΔR2=0.7, Kr2=0.8
ΔG2=0.7, Kg2=0.85
ΔB2=0.7, Kb2=0.98

As thus described, even when the luminance of the LED light sources changes due to a temperature change and a temporal change after initial setting of the luminance/chromaticity of the multi-screen display device, an amount of luminance having previously been decreased by a correction factor regarding luminance/chromaticity of each image display device can be corrected by luminance change rates of R, G and B, so as to hold the luminance/chromaticity of the multi-screen display device constant without changing the current flowing through the LED light sources and further decreasing the luminance level more than necessary.

It is to be noted that, although in the second preferred embodiment the luminance change rates of R, G and B were respectively multiplied by 1/Kr, 1/Kg and 1/Kb in FIG. 8, those may be multiplied by 1/Km=1/max (Kr, Kg, Kb). Specifically, in step S113a and step S113b of FIG. 8, when the change rates of R, G and B of the master device 100 are taken as ΔR1/Km1, ΔG1/Km1 and ΔB1/Km1 and the change rates of R, G and B of the slave device 101 are taken as ΔR2/Km2, ΔG2/Km2 and ΔB2/Km2, and when in step S115a, the master device 100 detects the target luminance change rate ΔRGB=min (ΔR1/Km1, ΔG1/Km1, ΔB1/Km1, ΔR2/Km2, ΔG2/Km2, ΔB2/Km2), calculation can be simplified, thereby to reduce parameters to be registered in the memory 11.

<B-2. Effect>

According to the second preferred embodiment of the present invention, in the multi-screen display device, the setting part sets a target luminance change value by use of a luminance level after luminance/chromaticity correction, and it is thereby possible to perform luminance correction in consideration of an amount of luminance having been decreased due to a temporal change, so as suppress a decrease in luminance level more than necessary.

Further, according to the second preferred embodiment of the present invention, in the multi-screen display device, the setting part sets the target luminance change value by use of the maximum value among the luminance levels after luminance/chromaticity correction, and it is thereby possible to reduce parameters so as to simplify calculation at a time of luminance correction in consideration of an amount of luminance having been decreased due to a temporal change.

While the invention has been shown and described in detail, the foregoing description is in all aspects illustrative and not restrictive. It is therefore understood that numerous modifications and variations can be devised without departing from the scope of the invention.

What is claimed is:

1. A multi-screen display device comprising a plurality of image display devices, wherein
said plurality of image display devices include one master device and one or a plurality of slave devices communicable with said master device,
each of said image display devices comprising:
a light source;
a light valve that modulates light of said light source;
a screen onto which an image is projected by modulated output light of said light valve; and
a luminance sensor that detects luminance of light from said light valve and outputs a luminance detection value in a case of said light valve being in an off-state,
wherein said master device includes a setting part that sets a luminance setting value unified among said plurality of image display devices based on a value in accordance with said luminance detection values in said plurality of image display devices,
wherein each of said image display devices further comprising:
a controller that controls luminance/chromaticity of an image displayed on said screen in each device based on said luminance setting value;
a storing part that stores said luminance detection value;
a calculator that calculates a luminance change value as a value in accordance with said luminance detection value by use of said luminance detection value stored into said storing part and an initial luminance detection value stored into said storing part;
a temperature sensor that detects a temperature in said luminance sensor;
a corrector that corrects said luminance detection value by use of an output of said temperature sensor, and outputs a temperature-corrected luminance value; and
an operator that computes an individual correction factor specific to each of said image display devices based on said target luminance value, wherein
said setting part in said master device sets a target luminance change value as said luminance setting value with respect to a target luminance value unified among said plurality of image display devices, based on said luminance change values in said plurality of image display devices,
said storing part stores said temperature-corrected luminance value and said individual correction factor,
said calculator calculates a luminance change value by use of said temperature-corrected luminance value stored into said storing part and an initial temperature-corrected luminance value stored into said storing part, and said controller corrects said individual correction factor based on said target luminance change value, and controls luminance/chromaticity of an image displayed on said screen in each device based on said corrected individual correction factor.

2. The multi-screen display device according to claim 1, wherein said target luminance value is set based on the minimum luminance detection value among said plurality of image display devices.

3. The multi-screen display device according to claim 1, wherein said luminance change value is a ratio of said temperature-corrected luminance value stored into said storing part to an initial temperature-corrected luminance value stored into said storing part.

4. The multi-screen display device according to claim 1, wherein said controller controls luminance/chromaticity of an image displayed on said screen in each device by use of a value obtained by multiplying said target luminance change value, said individual correction factor and said luminance change value.

5. The multi-screen display device according to claim 1, wherein said setting part corrects an amount of luminance, having been decreased by said individual correction factor, by use of a luminance level after luminance/chromaticity correction, to set said target luminance change value.

6. The multi-screen display device according to claim 5, wherein said setting part sets said target luminance change value by use of the maximum value among said luminance levels after said luminance/chromaticity correction.

7. The multi-screen display device according to claim 1, wherein said controller does not control luminance/chromaticity of an image displayed on said screen in each device in the case of said target luminance change value being not larger than a predetermined value.

8. The multi-screen display device according to claim 1, wherein said light source is a semiconductor light source.

9. The multi-screen display device according to claim 8, wherein said luminance sensor is provided in units of RGB of said semiconductor light source.

10. The multi-screen display device according to claim 9, wherein said controller is controllable in the units of said RGB of said semiconductor light source.

11. An image display method comprising:

providing a plurality of image display devices, wherein said plurality of image display devices include one master device and one or a plurality of slave devices communicable with said master device, and wherein each of said image display devices having a light source, a light valve that modulates light of said light source, a screen onto which an image is projected by modulated output light of said light valve, and a luminance sensor that detects luminance of light from said light valve and outputs a luminance detection value in a case of said light valve being in an off-state;

setting, by utilizing a setting part included in said master device, a luminance setting value unified among said plurality of image display devices based on a value in accordance with said luminance detection values in said plurality of image display devices;

controlling luminance/chromaticity of an image displayed on said screen in each device based on said luminance setting value;

storing said luminance detection value;

calculating a luminance change value as a value in accordance with said luminance detection value by use of said stored luminance detection value and an stored initial luminance detection value;

detecting, by utilizing a temperature sensor, a temperature in said luminance sensor;

correcting said luminance detection value by use of an output of said temperature sensor, outputting a temperature-corrected luminance value;

computing an individual correction factor specific to each of said image display devices based on said target luminance value;

setting, by utilizing said setting part included in said master device, a target luminance change value as said luminance setting value with respect to a target luminance value unified among said plurality of image display devices, based on said luminance change values in said plurality of image display devices;

storing said temperature-corrected luminance value and said individual correction factor;

calculating a luminance change value by use of said stored temperature-corrected luminance value and an stored initial temperature-corrected luminance value;

correcting said individual correction factor based on said target luminance change value; and controlling luminance/chromaticity of an image displayed on said screen in each device based on said corrected individual correction factor.

* * * * *